United States Patent

[11] 3,618,094

| [72] | Inventor | Harold R. Ward |
| | | Bedford, Mass. |
| [21] | Appl. No. | 872,611 |
| [22] | Filed | Oct. 30, 1969 |
| [45] | Patented | Nov. 2, 1971 |
| [73] | Assignee | Raytheon Company |
| | | Lexington, Mass. |

[54] RADAR FREQUENCY SPECTRUM CONTROL CIRCUIT
3 Claims, 1 Drawing Fig.

| [52] | U.S. Cl. | 343/17.1, |
| | | 325/142 |
| [51] | Int. Cl. | G01s 7/28 |
| [50] | Field of Search | 343/17.1; |
| | | 325/141, 142 |

[56] References Cited
UNITED STATES PATENTS
3,418,581  12/1968  Kennedy et al. ............... 325/141

Primary Examiner—T. H. Tubbesing
Attorneys—Philip J. McFarland and Joseph D. Pannone ABSTRACT: A pulse radar system wherein the frequency spectrum of each transmitted signal is narrower than the frequency spectrum of each pulse of radio frequency energy produced by the system's power oscillator. The desired narrowing is accomplished by providing means for amplitude modulating the output signal from the system's power oscillator in such a way that substantially all of the radio frequency energy, except that which is generated during the main portion of each pulse, is inhibited from passing to the antenna.

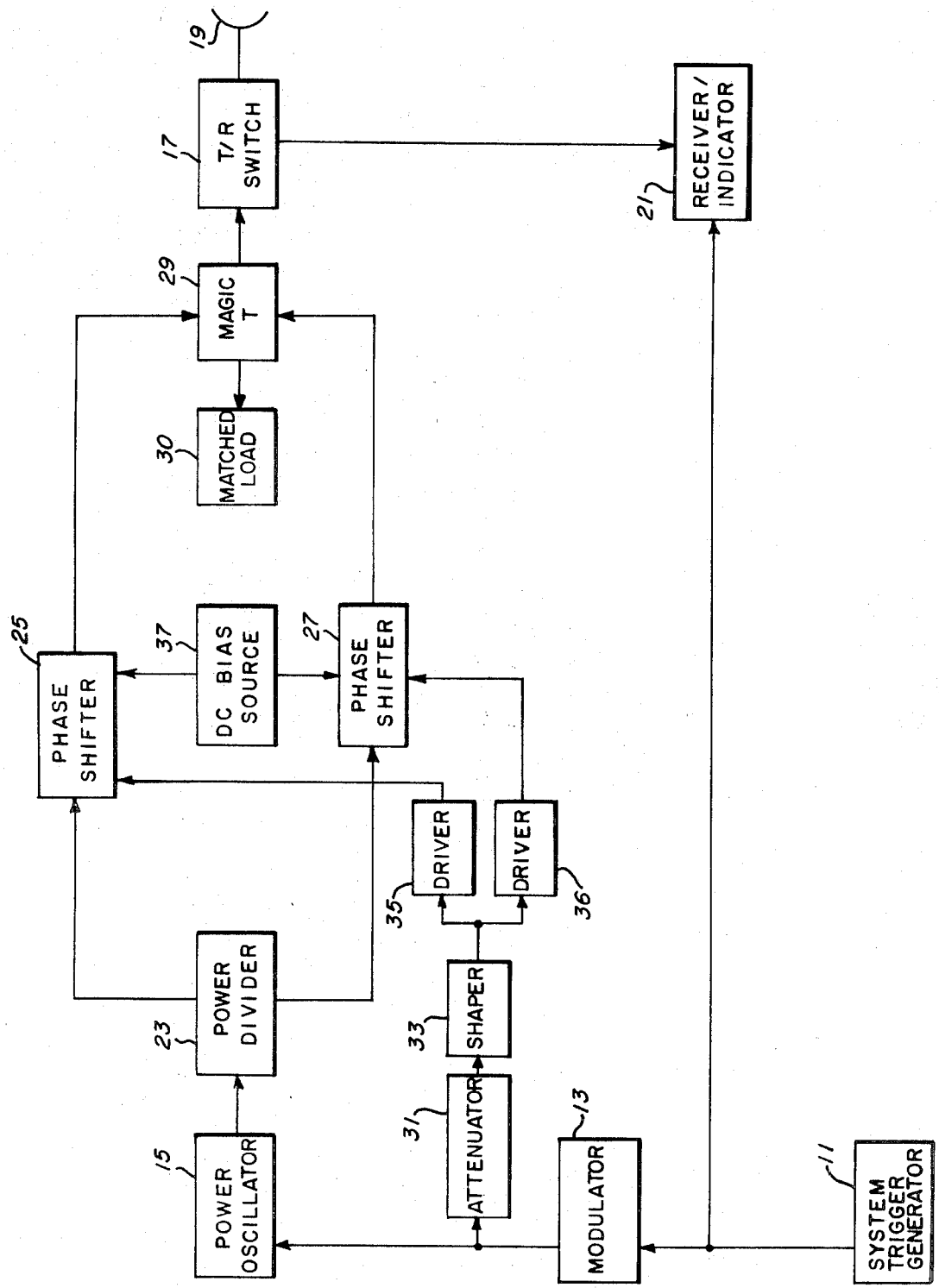

RADAR FREQUENCY SPECTRUM CONTROL CIRCUIT

BACKGROUND OF THE INVENTION

It has been recognized for many years that, unless special precautions are taken, pulse radar systems may transmit, along with the desired pulse signal having a predetermined frequency, spurious signals within a rather broad spectrum of frequencies. With the proliferation of radar systems of relatively high power, the transmission of such spurious signals has led to serious operational difficulties. That is, mutual interference between radar systems has become a problem of significant import.

In an effort to ameliorate the problem, cognizant authorities have promulgated regulations limiting the power level of spurious signals from any radar system to an absolute level. While such regulations have been of value in reducing mutual interference between systems, it is obvious that such measures are, at best, simply palliative. It is, of course, far to be preferred that the root causes of spurious signals be determined and measures be taken to reduce such signals.

While power oscillators, such as magnetrons, are far more prone to producing spurious signals than other types of microwave signal generators, such as klystrons, it is known that all pulse radar systems inherently suffer from such a failing. That is, the frequency spectrum of transmitted pulses must, to a greater or lesser degree depending upon pulse shape, extend to either side of the carrier frequency.

The problem of frequency deviation is of particular difficulty when a self-excited oscillator, as a magnetron, is used by reason of the fact that such oscillators cannot be operated to "turn on" or "turn off" in a controlled manner. For example, if it be desired to pulse a magnetron for a period nominally of 2$\mu$sec., it is necessary to allow for a 0.25$\mu$sec. "rise time" (during which period oscillations of the proper mode are built up) and a 0.25$\mu$sec. "fall time" (during which period oscillations decay). In the normal situation, the required "rise" and "fall" times are provided for by shaping the modulator pulse so that the anode potential does not instantaneously jump from one extreme to the other, but rather is increased, or decreased, at a finite rate. Unfortunately, however, such a change gives rise to frequency pushing.

It has been proposed to provide a narrow band-pass filter in the output line from a power oscillator to control the transmitted frequency spectrum. The theory underlying such an approach is that such a filter will permit only signals within a preselected frequency band to be radiated while suppressing an "out-of-band" signals which may be generated by the power oscillator. For example, well-known cavity resonators, which are of some utility for this purpose, require that: (1) the peak power of the radiated pulse be lower than such power would otherwise have to be; and (2) means be provided to match, critically, the resonant frequency of the cavity to the desired operating frequency of the magnetron.

Therefore, it is a primary object of this invention to provide improved means for reducing the width of the frequency spectrum of transmitted signals from a pulse radar system.

Another object of this invention is to provide improved means as above which operates automatically to reduce such spectrum regardless of the width thereof.

Still another object of this invention is to provide improved means as above which, once installed, may be operated under widely varying conditions without requiring critical adjustments.

SUMMARY OF THE INVENTION

These and other objects of this invention are attained generally by dividing the microwave frequency pulse signal into two separate paths, shifting the phase of such energy in each path so that the energy in one path is out-of-phase with the energy in the second path except when the frequency of the energy is at a desired value, and recombining the energy in the two paths to accomplish amplitude modulation before application to an antenna.

BRIEF DESCRIPTION OF THE DRAWINGS

Other objects and many of the attendant advantages of the invention will be appreciated as the same become better understood by reference to the following detailed description when considered in connection with the accompanying drawing wherein the figure shows a block diagram illustrating the features of the invention.

Referring now to the figure, it may be seen that a radar system according to this invention includes a system trigger generator 11, a modulator 13, a power oscillator 15, a transmit/receive switch 17, an antenna 19 and a receiver/indicator 21. Each of these elements is of conventional construction. The power oscillator here is contemplated to be a magnetron of appropriate configuration for the power levels and frequency to be transmitted. Interposed between the power oscillator 15 and the transmit/receive switch 17 is a microwave network (not numbered) which, as will become clear hereinafter, is operative to permit only the portion of the output pulse signal from the power oscillator 15 of a preselected frequency to pass through the transmit/receive switch 17 and be transmitted from the antenna 19 and to shape the envelope of such output pulse signal.

A power divider 23, preferably a conventional hybrid junction commonly referred to as a "Magic T", is connected to the output line from the power oscillator 15. Such a junction, as is well known, may be arranged so that radio frequency power such as is produced by the power oscillator 15 may be divided equally between two separate paths. Thus, the signal from the power oscillator 15, after being divided by the power divider 23, is passed to a first and a second phase shifter 25, 27 as shown. The phase shifters 25, 27 preferably are conventional Faraday-effect elements of conventional construction. That is, each such element includes a gyromagnetic material, as ferrite or yttrium iron garnet, within the field of a solenoid. By appropriate adjustment of the intensity of the magnetic field of the solenoid the phase shift of radio frequency energy passing therethrough may be controlled. Each one of the phase shifters 25, 27 in turn is connected to a Magic T 29. Again, as is well known, the Magic T 29 may be arranged to combine two microwave signals into a single signal. The Magic T 29 is connected to the transmit/receive switch 17 and to a matched load 30 as shown.

A portion of the output signal from the modulator 13 (which may be a conventional integrator) is passed through an attenuator 31 and a shaper 33 to actuate drivers 35, 36, each of which, in turn, is connected to the first and second phase shifters 25, 27 as indicated. To complete the circuit a DC bias source 37 is also connected to the phases shifters 25, 27.

The adjustment and operation of the described circuit now follows. To adjust the circuit, a microwave signal from a conventional signal generator (not shown) is impressed on the input to the power divider 23, the power oscillator 15 i.e., The frequency of such signal is adjusted until it differs by a predetermined amount from the nominal frequency of the power oscillator 15. The signal out of the Magic T 29 is detected in any convenient manner (not shown) with the T/R switch disconnected. The DC bias source 37 is adjusted until the output signal from the Magic T 29 is a minimum. When this occurs, phase shifter 25 advances the phase of the energy passing through it by 90° and phase shifter 27 retards the phase of energy passing through it by 90°; i.e., there is a difference of 180° between the phase of the two signals impressed on the two input terminals of the Magic T 29. The signal out of the Magic T 29 is, therefore, at a minimum.

With the power oscillator 15 and T/R switch 17 connected and the system energized, the portion of each modulation pulse passing through the attenuator 31 and to the shaper 33 is effective to cause the drivers 35, 36 each to produce an output signal when the amplitude of the modulation signal reaches, say 80 to 90 percent of its maximum. Each such output signal, when applied as shown to the phase shifters 25, 27, bucks the DC bias source 37. Consequently, the phase shift imparted by each one of the phase shifters 25, 27 changes so that the energy into the two input terminals of the Magic T 29 is in phase. The output signal from the Magic T 29, therefore, is diverted from the load 30 to the T/R switch 17 and the antenna 19. It will be noted that the change does not take place instantaneously, but rather at a rate mainly dependent upon the characteristics of the shaper 33 although the "electrical inertia" of the other elements, i.e., the drivers 35, 36 and the phase shifters 25, 27 and the shape of the modulation pulse obviously are of some importance. In any event, during the period in which the phase of the energy into the Magic T 29 is changing, the amplitude of the signal at the antenna 19 varies smoothly from a minimum to a maximum. Further, because the driver 35 is constrained to maintain the phase shifters 25, 27 in their off-normal state as long as the amplitude of the modulating signal exceeds the selected level, the amplitude of the signal from the Magic T 29 to the antenna 19 remains at its maximum when the frequency of the signal out of the power oscillator 15 is substantially constant.

From the foregoing, it may be seen that the portion of the disclosed circuit between the power divider 23 and the Magic T 29 selectively operates to modulate the amplitude of the signal out of the power oscillator 15. Thus, during the "rise time" and "fall time" of each pulse signal from the power oscillator 15, i.e., during the periods in which the frequency of the signal from the power oscillator 15 may differ from a desired frequency, the referred to portion of the circuit operates to attenuate the energy then occurring. The amount of attenuation, in turn, is controlled so that the "rise time" and "fall time" of the finally propagated pulse is controlled. These two effects, when combined, inhibit energy of unwanted frequency from being propagated and narrow the frequency spectrum of the propagated pulse.

Having described one embodiment of this invention, a moment's thought will make it clear that the concept of amplitude modulating the output signal of a power oscillator to attenuate unwanted signals and the concept of smoothly varying such modulation during the "rise time" and "fall time" may be implemented in other ways. Thus, for example, the shaper need not be an integrator; the phase shifting control circuit itself need not be responsive to the amplitude of the modulation signal; and additional phase shifters may be placed in circuit to permit different amounts of power to be modulated at different rates.

It is felt, therefore, that the invention should not be restricted to its disclosed embodiments but rather should be limited only by the spirit and scope of the following claims.

What is claimed is:

1. In a radar system including an antenna from which pulses of radio frequency energy are radiated, the frequency of such energy being substantially constant, and a power oscillator for producing pulses of radio frequency energy, the frequency spectrum of such energy in each one of such pulses being greater than the frequency spectrum of the radio frequency energy in each corresponding one of the radiated pulses, a radio frequency spectrum control circuit comprising;

a. first hybrid junction means for dividing the radio frequency energy in each pulse thereof produced by the power oscillator into two substantially equal portions and directing each one of such portions through a separate transmission path;

b. phase shifting means, disposed in at least one of such paths, for changing the phase of radio frequency energy passing therethrough in accordance with a control signal;

c. control signal generating means, responsive to each one of the pulses of radio frequency energy from the power oscillator, for producing the control signal; and d. second hybrid junction means for combining the radio frequency energy in the separate transmission paths and directing such combined energy to the antenna when the control signal exists.

2. A radio frequency control circuit as in claim 1 wherein the phase shifting means includes a first and a second phase shifter, disposed respectively in one of the separate paths, one such phase shifter being disposed, in the absence of a control signal, to advance the phase of radio frequency energy passing therethrough by 90° and the other such phase shifter being disposed, in the absence of a control signal, to retard the phase of radio frequency energy passing therethrough by 90°.

3. In a radar system including an antenna from which pulses of radio frequency energy are radiated, the frequency of such energy being substantially constant, and a power oscillator for producing pulses of radio frequency energy, the frequency spectrum of such energy in each one of such pulses being greater than the frequency spectrum of the radio frequency energy in each corresponding one of the radiated pulses, a radio frequency spectrum control circuit comprising:

a. first hybrid junction means for dividing the radio frequency energy in each pulse thereof produced by the power oscillator into two substantially equal portions and directing each one of such portions through a separate transmission path;

b. phase shifting means, responsive to a control signal, for selectively changing the phase of the radio frequency energy in each one of such portions thereof, such phase shifting means including a first and second phase shifter disposed, respectively, in one of the separate paths, the first phase shifter being adapted, in the absence of a control signal, to advance the phase of radio frequency energy passing therethrough by 90° and the second phase shifter being adapted, in the absence of a control signal, to retard the phase of radio frequency energy passing therethrough by 90°;

c. control signal generating means, responsive to each one of the pulses of radio frequency energy from the power oscillator, for producing a control signal for the first and the second phase shifter thereby to shift the phase of radio frequency energy passing through each one of such phase shifters to make the radio frequency energy in the two substantially equal portions thereof "in phase"; and, d. second hybrid junction means, responsive to the two substantially equal portions of the radio frequency energy for combining the radio frequency energy in the separate transmission paths and directing such combined energy to the antenna when the control signal exists.

* * * * *

UNITED STATES PATENT OFFICE
CERTIFICATE OF CORRECTION

Patent No. 3,618,094          Dated November 2, 1971

Inventor(s) Harold R. Ward

It is certified that error appears in the above-identified patent and that said Letters Patent are hereby corrected as shown below:

Column 2, line 54, after "15" delete "i.e.," and insert -- being disconnected. --

Signed and sealed this 11th day of April 1972.

(SEAL)
Attest:

EDWARD M. FLETCHER, JR.
Attesting Officer

ROBERT GOTTSCHALK
Commissioner of Patents